Feb. 23, 1932. K. STRICHOW 1,846,280
DEVICE FOR MEASURING AND RECORDING LIQUIDS IN A PREDETERMINED QUANTITY
Filed Sept. 24, 1926    3 Sheets-Sheet 1
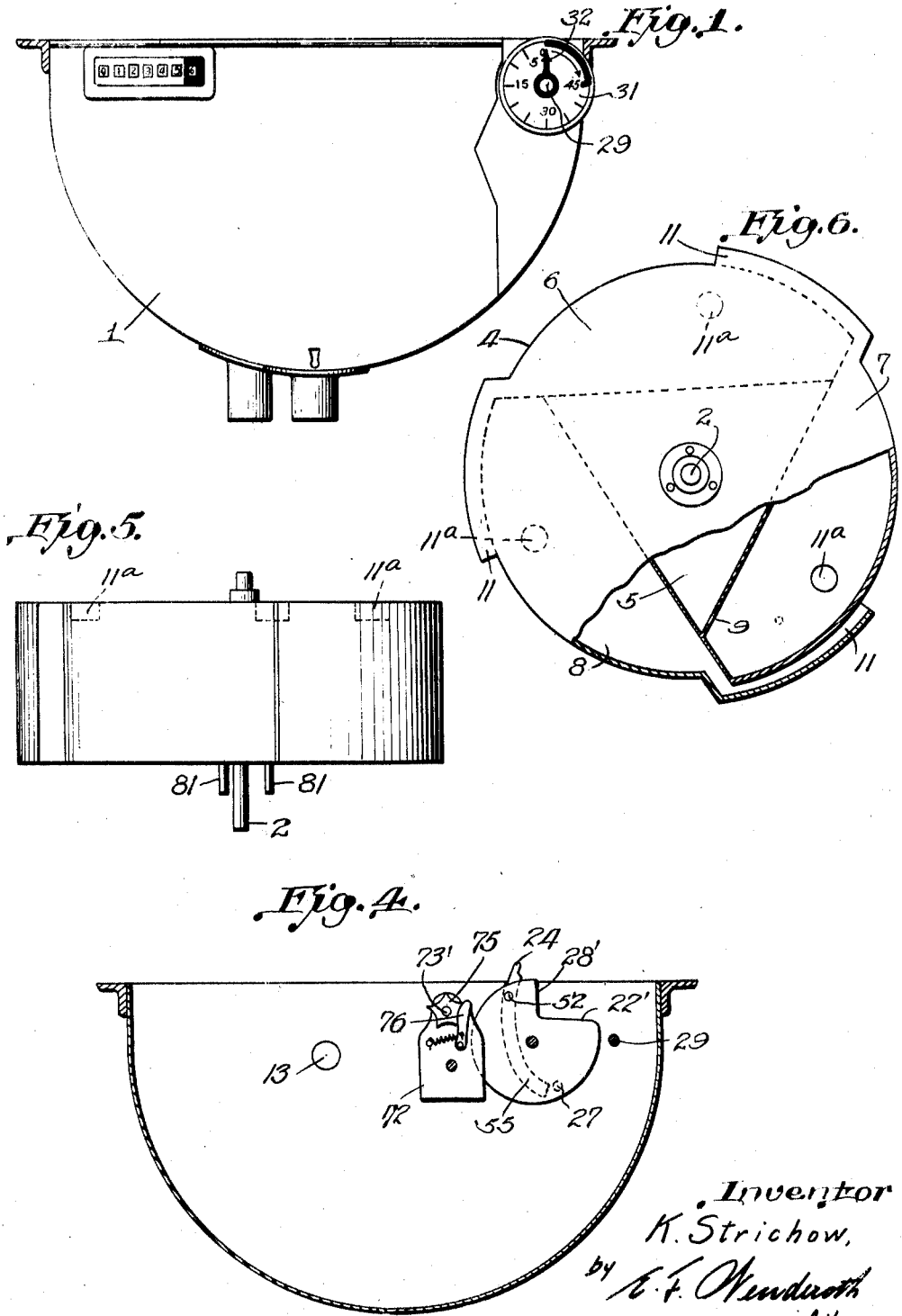

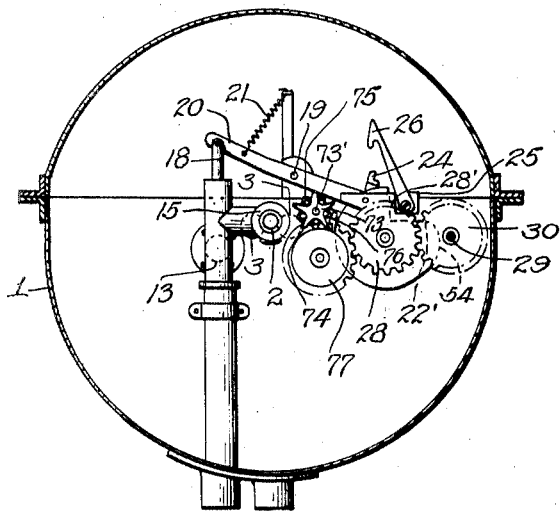
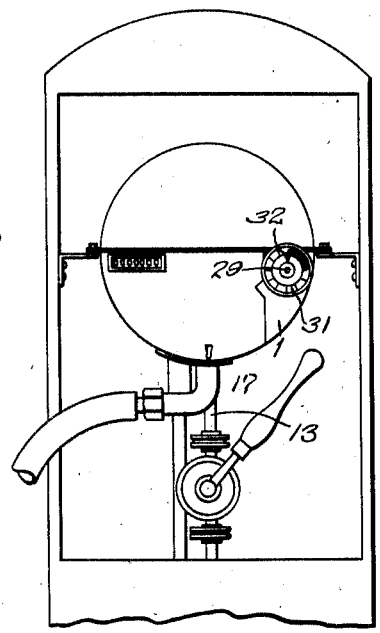
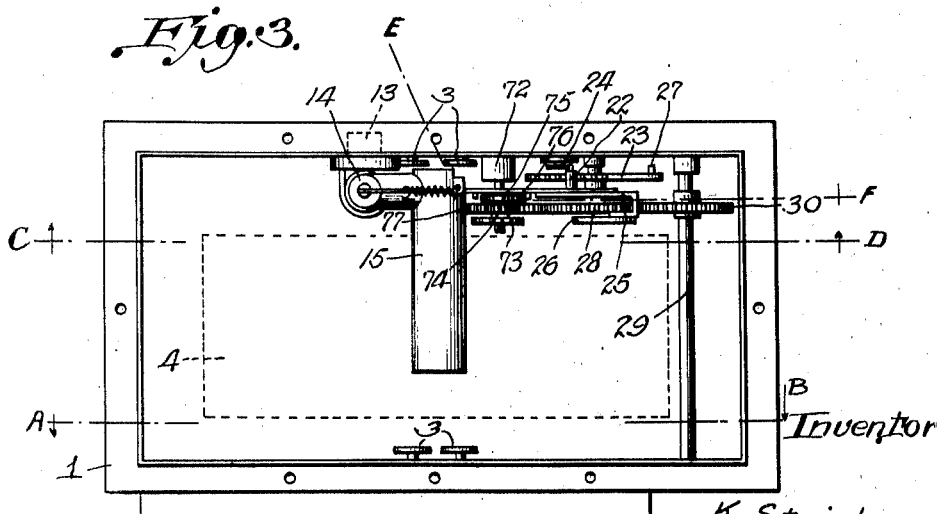

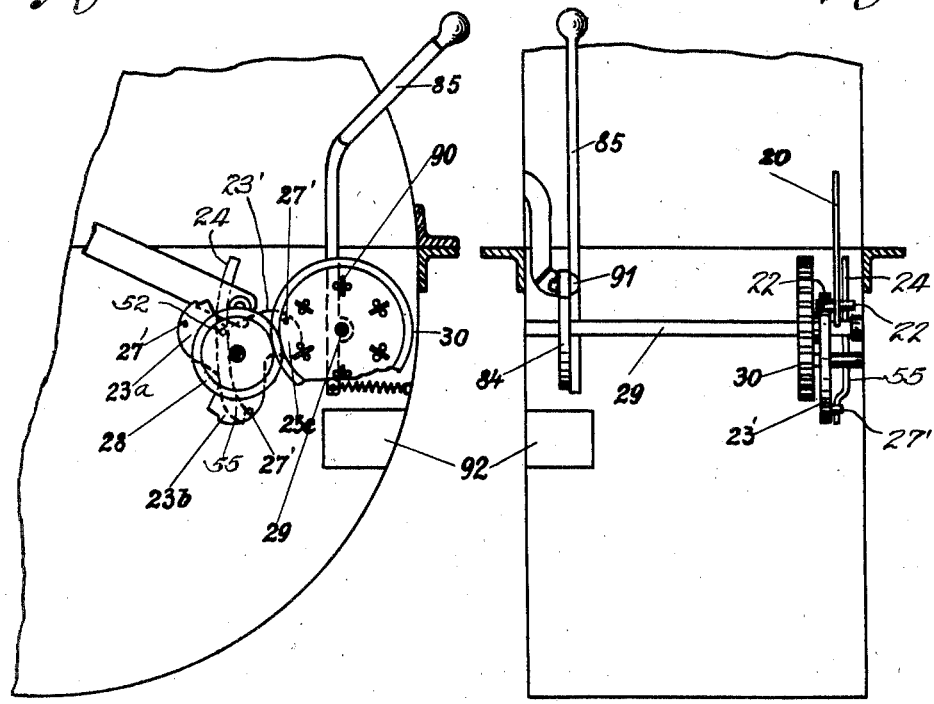

Patented Feb. 23, 1932

1,846,280

UNITED STATES PATENT OFFICE

KARL STRICHOW, OF BERLIN, GERMANY

DEVICE FOR MEASURING AND RECORDING LIQUIDS IN A PREDETERMINED QUANTITY

Application filed September 24, 1926, Serial No. 137,593, and in Germany September 28, 1925.

This invention relates to a dispensing device for liquids, whereby the quantity of liquid to be delivered by the device is pre-determined by the adjustment of a pointer or the like.

The device according to this invention is so constructed that every possibility of exerting an influence upon the quantity of liquid to be delivered to the purchaser is done away with. This is accomplished by having all measuring and controlling instrumentalities mounted within a closed casing while a single means in the form of an adjusting pointer or hand-lever, which can be rendered accessible from the outside only by the introduction of a coin or the like, serves for putting the device into and out of operation.

This invention consists essentially in the fact that a rotating drum is employed as a measuring device, and more particularly in such a manner that the supply of the liquid to be measured is entirely controlled by the rotation of said drum.

According to this invention only the pointer for determining the quantity of liquid to be delivered by the device is made accessible. This pointer furthermore acts in such a manner that it will first enable liquid to be supplied to the measuring drum and will also control the quantity of liquid to be delivered by the adjustment of a cam-disc.

The measuring drum according to this invention comprises a central distributing chamber of triangular cross-section and three peripheral measuring chambers connected to said distributing chamber, said peripheral measuring chambers being segmentally formed. The liquid which enters the chambers will constitute an eccentric weight in the measuring chambers, thereby rotating the measuring drum and actuating a controlling element proper. This controlling element will cause the closing organ for the supply conduit for the liquid to be closed at the proper time in accordance with the quantity of liquid to be delivered, which is predetermined by the adjustment of the pointer.

According to this invention, furthermore, the setting mechanism of the device, instead of being controlled by an adjustable pointer, may be constructed to be controlled by the introduction of a coin. This is accomplished by means of a hand lever which is coupled, through the coin, with the shaft of the pointer. In order to shorten the amount of motion of the setting mechanism thus controlled by the coin, the cam-disc which controls the time of opening and closing of the closing organ may be provided with a plurality of elevated parts and releasing pins.

In the accompanying drawings I have represented an example of the construction of my new measuring and recording device for liquids.

Fig. 1 is a front view of the under part of the casing of the measuring and recording device with the drum removed, Fig. 2 is a vertical section through the device on the line C—D of Fig. 3, Fig. 3 is a top view of the device with the upper part of the casing removed, Fig. 4 a vertical section through the device on the line E—F of Fig. 3, Fig. 5 a top view of the drum, Fig. 6 a front view of the drum, partly in section.

Fig. 7 shows the device in a modified form, which is adapted to be operated by the introduction of a coin or the like on the line G—H of Fig. 9.

Fig. 8 shows the device in the same arrangement in section on the line J—K of Fig. 9, Fig. 9 is a plan view of the part of the device shown in Figs. 7 and 8, Fig. 10 is a front elevation of the device mounted within a cabinet or container.

In the drawings, 1 designates the casing, which is constructed from sheet metal or the like, said casing carrying within its interior the drum 4, which is rotatably mounted by means of an axle 2 upon the rollers 3. The drum 4, as shown in Fig. 6, is divided into four chambers, the central chamber 5 being of substantially triangular cross-section, and the peripheral chambers 6, 7 and 8 being of segmental cross-section.

The chambers 6, 7 and 8 are each connected through an opening 9 with the central chamber 5 and are provided with discharge channels 10 having openings 11. The outer walls of the discharge channels 10 are arranged concentrically with respect to the drum 4, while the intermediate parts of the exterior periphery of the drum are positioned concentrically with respect to the center point. In order to exactly determine the volume of the several measuring chambers, stoppers 11a, which may be constructed as hollow bodies from sheet metal, are inserted into the drum 4 from the front end of the latter.

Certain mechanisms will be noted from Fig. 3 in contact with or adjacent to the back wall of the casing and certain other mechanisms in contact with or adjacent to the front wall. These mechanisms are cooperably connected by a shaft 29 which extends across the interior of the casing near one end, avoiding the path of rotation of the elements mounted on the drum. Referring now to Figs. 1 and 10, which show the outer or front end of the casing, it will be noted that shaft 29 extends through said front wall to the outside at the center of a circular scale 31 and has attached thereto a pointer 32 concentric with said scale and rotatable over the face of said scale. Said pointer functions as a handle and constitutes the manipulative part of a setting device hereinafter frequently referred to throughout the specification.

When the pointer is turned clockwise, see Fig. 1, it rotates the shaft 29 clockwise and thus affects the mechanism which is on the rear side of the control device. This mechanism consists of a gear 30 meshing with a gear 28, the latter meshing with a gear 77. The gears 28 and 77 are mounted on stub shafts secured to the rear wall of the casing. It is to be understood that on the stub shaft of the gear 28 is a cam 23. This cam, as will be noted from Fig. 2, has an abrupt shoulder forming a depression, and a circular contour. It actuates a lever 20 pivoted to the casing at 19 and it opens and closes a source of liquid supply to the drum by means of a valve 14 having a stem 18. The lever 20 is normally kept raised by spring 21 and when in this position the liquid supply to the drum is cut off. When the lever is depressed it depresses the valve, placing a supply conduit 13 into communication with a supply pipe 15 which is open to the drum. It is clear that the end of the lever 20 is depressed to open said valve when the opposite end of said lever is raised. In Fig. 3 a pin 22 is noted on the said opposite end from the valve and it is clear that when the pin 22 is elevated it rocks the lever, depressing the valve 14 and putting the source of liquid supply into communication with the measuring device for rotating it.

The pin 22 rests on the surface of the cam 23 and when the pin drops from the abrupt shoulder into the depression of the cam the spring 21 is free to raise the outer end of the lever closing the valve 14 in the zero position of the various parts of the device.

The pin 22 is then in the depression formed by the abrupt shoulder of the cam and the parts are in the position shown in Fig. 2.

The setting device is set by rotating the pointer 32 clockwise. The entire setting movement may be continuous, but for convenience it will be considered as comprising two periods, the first being that in which the pointer is moved in a clockwise direction throughout the arc shown in black on the scale disc. When the pointer is moved through this arc the gear 30 rotates the gear 28 and with it the cam 23 through an angle sufficient to engage the pin 22 with the wall of the depression in the cam and move said pin upwardly, depressing the lever 20 and with it the valve to the point where it is about to admit liquid to the measuring member 4.

It will be understood now that by rotation of the pointer through the black arc on the scale disc, the valve 14 is moved to the point at which it is about to operate to cause rotation of the measuring member.

After the pointer 32 has been moved from zero throughout the extent of the black arc on the scale disc it is continuously moved in the same direction until it reaches a value on said disc representing the number of units of liquid which it is desired that the drum shall deliver.

When the pointer is moved beyond the black arc the pin 22 will ride out upon the abrupt shoulder 22' of the cam disc upon the surface of the cam. This raises the adjacent end of the lever sufficiently far to depress the opposite end to a point where the valve intercepts the passage 13 admitting motor fluid to the drum. The latter then rotates, and as it rotates through each revolution, or in the present instance through each aliquot part of a revolution for which it is designed to deliver a unit quantity of liquid, the pins 81 periodically engage a star wheel 73 mounted on a stub shaft 73' journalled in an appropriately shaped bracket 72 secured to the rearward wall of the casing and the star wheel in turn rotates a gear 74 on said stub shaft, which meshes with the gear 77, turning the latter in the same direction as that in which it was rotated by the setting means, thus continuing the rotation of the gear 28 and the cam 23, bringing the cam to the position at which the pin 22 falls from the abrupt shoulder 28' at the opposite side of the depression in said cam, permitting the outer end of the lever 20 to rise under the urge of the spring 21 lifting the valve 14 to its closing position and cutting off the supply of fluid to the measuring member, causing the latter to come to a standstill. The small ratchet 75 with its cooperating pawl 76 shown in Fig. 4 on the stub shaft 73' is merely for the purpose of ensuring that the star wheel 73 will always be in proper position to be engaged by the pins 81 on the measuring drum.

It is obvious that if the cam is moved by the setting means so as to advance the pin 22 a relatively great distance along the cam there will be a correspondingly shorter distance for the pin to travel along said cam under the rotating influence of said measuring member, and consequently the latter will rotate a fewer number of times or aliquot parts of a revolution so that the arcuate distance through which the pointer is initially set on the scale disc is the supplement of the distance through which it will be moved by the measuring member.

For avoiding inaccuracy and wear, due to the sliding or rolling of the pin 22 on the circumference of the cam 23, and for accurately defining the moment of closing the valve 14, the lever 20 may be supported in its valve opening position by a pawl 24, which is arranged upon a pivot 52 on the rear wall of the casing. If the pin 22 is raised by the shoulder 22' it tilts the pawl 24 counter-clockwise against the action of the weight of the curved tail 55 of the said pawl, until it gets upon the head of this pawl, by which it is supported. The part 54 of the circumference of the cam 23 has a radius greater than that of the other circular and concentric part of the said circumference, so that after the pin 22 has been raised by the elevated part 54 upon the head of the pawl 24, there is no longer any contact between the cam 23 and the pin 22.

In the moment in which the valve is to be closed and in which the pointer 32 has again reached its zero position, the pin 22 and with it the lever 20 and the valve 14 are released by a pin 27, arranged at the rear side of the cam 23. This pin 27 presses against the curved tail 55 of the pawl 24, tilting said pawl counter-clockwise, so that the pin 22 is released. The lever 20 is then raised under the urge of the spring 21 and the valve 14 closed. The pin 22 returns into the depression of the cam 23, and all parts are in the zero position.

To obtain a high accuracy of measurement it is desirable that the measuring chamber 6, 7 or 8, which has just been filled with liquid, should be completely and positively emptied at the moment of closing the supply conduit.

This is accomplished by a pawl 26, connected to the free end 25 of the lever 20. If this free end 25 is moved downward under the action of the spring 21 for closing the valve 14 in the supply conduit, the pawl 26 goes downward too, engaging one of three pins 82 arranged at the rear side of the measuring drum, so that the drum 4 is rotated a small amount, which is sufficient to empty the measuring chamber 6, 7 or 8 completely. This has the further advantage that the device is always emptied before and after the process of delivery, so that different liquids, such as benzine, benzol or the like, may be passed through the device for being measured, without causing any inconvenience.

It is not necessary to employ any person for operating the device according to this invention. If the device is constructed as an automatic vending apparatus according to Figs. 7 to 9 of the drawings, a coin or the like which is introduced into the device will be so positioned in the slot 90 of the disc 84, that it will press against the lever 85 at the point 91 thereof, so that upon depression of said lever the shaft 29 will be rotated, thus effecting the opening of the valve 14. Upon further rotation of the disc 84 the coin which is positioned within the slot 90 will fall into a collecting container 92 which is placed underneath said slot. The measuring drum 4, which is thereupon rotated by the entering liquid, will move the cam-disc 23' by means of the star wheel 73 and the gear transmission (Figs. 2 and 3) said cam-disc after delivery of a definite preferably constant quantity of liquid pressing with one of its pins 27' against the pawl 24, thus causing the lever 20 to be released. By this the supply conduit 13 will be closed by means of the valve 14. The cam-disc 23' is provided with three cam-shaped parts 23a, 23b, 23c and three releasing pins 27'. In this manner every purchaser of liquid will be in a position to operate the device without the aid of any employee, by introduction of a coin or the like and by simply pressing the actuating lever 85. The quantity of liquid which is delivered by the device corresponds to the value of the coin introduced.

The liquid which is delivered by the device may be collected in any kind of container, or may be directly supplied, for instance, to the gasoline tank of a motor car or the like. If a greater quantity of liquid is desired, it will only be necessary to operate the device repeatedly.

While I have in the above specification endeavoured to describe what I believe to be a preferred and practical embodiment of my invention, it is to be understood that the details of the construction are merely given by way of example and are not limitative and that the invention is capable of being embodied in various constructions such as may fall within the scope of the appended claims.

I claim:

1. In a dispensing device, a measuring drum, means for causing the uni-directional step-by-step rotation of said drum under pressure of the liquid being measured, a valve for supplying said drum, a setting device returnable after being set, in response to movements of said drum, means actuated by said setting device for closing said valve after the predetermined number of revolutions of said drum for which said setting device is set, said means acting upon said drum at the time of closing said valve to rotate said drum a small amount after the liquid pressure has been cut off by said valve, for ensuring the emptying of said drum.

2. In a dispensing device, a measuring drum, means for causing the uni-directional, step-by-step rotation of said drum under pressure of the liquid being measured, a valve for supplying said drum, a setting device returnable after being set, in response to movements of said drum, and controlling said valve for closing the latter at the end of the predetermined number of revolutions of said drum for which said setting means has been set, said drum being mounted to rotate in a vertical plane, and being constructed with a central distributing chamber of substantially triangular cross section, and three measuring chambers of substantially segmental cross section with the sides of the triangle as chords, said measuring chambers being connected with said central chamber.

3. In a dispensing device, a measuring drum, means for causing the uni-directional, step-by-step rotation of said drum under pressure of the liquid being measured, a valve for supplying said drum, a setting device returnable after being set, in response to movements of said drum, and controlling said valve for closing the latter at the end of the predetermined number of revolutions of said drum for which said setting means has been set, said drum being mounted to rotate in a vertical plane and comprising a central distributing chamber of substantially triangular cross section, and three measuring chambers of substantially segmental cross section with the sides of the triangle as chords, said segmental chambers communicating with said central chamber near the apices of the angles thereof, and having discharge ports adjacent the ends of said measuring chambers which lie opposite the said points of communication.

4. In a dispensing device, a measuring drum, means for causing the uni-directional, step-by-step rotation of said drum under pressure of the liquid being measured, a valve for supplying said drum, a setting device returnable after being set, in response to movements of said drum, and controlling said valve for closing the latter at the end of the predetermined number of revolutions of said drum for which said setting means has been set, a cam disk operatively connected with the setting means so as to be controlled by the latter, and a spring actuated lever in sliding contact with said cam disk and adapted to control the supply valve for opening and closing the latter.

5. In a dispensing device, a measuring drum, means for causing the uni-directional, step-by-step rotation of said drum under pressure of the liquid being measured, a valve for supplying said drum, a setting device returnable after being set, in response to movements of said drum, and controlling said valve for closing the latter at the end of the predetermined number of revolutions of said drum for which said setting means has been set, a cam disk operatively connected with the setting means so as to be controlled by the latter, a spring-actuated lever in sliding contact with said cam disk and adapted to control said supply valve, a locking pawl for locking said lever in the position for maintaining open said supply valve, and a releasing member for releasing said locking pawl, said releasing member being operatively connected with said drum and adapted to release said locking pawl after the said predetermined number of revolutions of said drum has been completed.

6. In a dispensing device, a measuring drum, means for causing the uni-directional, step-by-step rotation of said drum under pressure of the liquid being measured, a valve for supplying said drum, a setting device returnable after being set, in response to movements of said drum, and controlling said valve for closing the latter at the end of the predetermined number of revolutions of said drum for which said setting means has been set, a cam disk operatively connected with the setting means so as to be controlled by the latter, a spring-actuated lever in sliding contact with said cam disk and adapted to control said supply valve, a locking pawl for locking said lever in the position for maintaining open said supply valve, and a releasing member for releasing said locking pawl, said releasing member being operatively connected with said drum and adapted to release said locking pawl after the said predetermined number of revolutions of said drum has been completed, the setting means including an adjustable pointer.

KARL STRICHOW.